United States Patent
Joo et al.

(10) Patent No.: US 11,128,803 B2
(45) Date of Patent: Sep. 21, 2021

(54) ELECTRONIC DEVICE FOR CORRECTING IMAGE AND METHOD FOR OPERATING THE SAME

(71) Applicant: Samsung Electronics Co., Ltd., Suwon-si (KR)

(72) Inventors: Woo-Hyun Joo, Suwon-si (KR); Jae-Ho Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 80 days.

(21) Appl. No.: 16/135,562

(22) Filed: Sep. 19, 2018

(65) Prior Publication Data

US 2019/0089906 A1 Mar. 21, 2019

(30) Foreign Application Priority Data

Sep. 19, 2017 (KR) .......................... 10-2017-0120537

(51) Int. Cl.
H04N 5/232 (2006.01)
H04N 5/225 (2006.01)
H04N 5/247 (2006.01)

(52) U.S. Cl.
CPC ....... H04N 5/23296 (2013.01); H04N 5/2258 (2013.01); H04N 5/2259 (2013.01);
(Continued)

(58) Field of Classification Search
CPC .............. H04N 5/2258; H04N 5/2259; H04N 5/23232; H04N 5/23238; H04N 5/23254;
(Continued)

(56) References Cited

U.S. PATENT DOCUMENTS 9,185,291 B1 11/2015 Shabtay et al.
9,307,149 B2 4/2016 Karpenko
(Continued)

FOREIGN PATENT DOCUMENTS

CN 101637019 A 1/2010
CN 103428516 A 12/2013
(Continued)

OTHER PUBLICATIONS

Extended European Search Report dated Feb. 13, 2019, issued in a counterpart European application No. 18195522.0-1209.
(Continued)

Primary Examiner — Peet Dhillon
(74) Attorney, Agent, or Firm — Jefferson IP Law, LLP

(57) ABSTRACT

An electronic device is provided. The electronic device includes a first camera, a second camera having a different view angle from the first camera, and at least one processor configured to obtain a first image set for an external object using the first camera and a second image set for the external object using the second camera, identify motion corresponding to the first camera for a part of a time during which the first image set and the second image set are obtained, obtain a correction area using at least some images of the first image set based on at least the motion corresponding to the first camera, identify a compensation area in at least some images of the second image set based on at least the correction area or the motion corresponding to the first camera, and obtain a motion-corrected image for the external object using the correction area and the compensation area. Other various embodiments are possible as well.

10 Claims, 18 Drawing Sheets

(52) U.S. Cl.
CPC ..... *H04N 5/23232* (2013.01); *H04N 5/23238* (2013.01); *H04N 5/23254* (2013.01); *H04N 5/23258* (2013.01); *H04N 5/23267* (2013.01); *H04N 5/23287* (2013.01); *H04N 5/247* (2013.01)

(58) Field of Classification Search
CPC ........... H04N 5/23258; H04N 5/23267; H04N 5/23287; H04N 5/23296; H04N 5/247
See application file for complete search history.

(56) References Cited

U.S. PATENT DOCUMENTS

| | | |
|---|---|---|
| 2008/0218612 A1 | 9/2008 | Border et al. |
| 2009/0002501 A1* | 1/2009 | Silsby .................... H04N 5/145 348/208.16 |
| 2009/0096879 A1* | 4/2009 | Motomura ......... H04N 5/23248 348/208.6 |
| 2010/0149372 A1* | 6/2010 | Silverstein ........... H04N 5/2258 348/223.1 |
| 2011/0013028 A1 | 1/2011 | Zhou et al. |
| 2012/0242851 A1* | 9/2012 | Fintel .................... H04N 5/772 348/221.1 |
| 2013/0307937 A1 | 11/2013 | Kim |
| 2016/0028949 A1 | 1/2016 | Lee et al. |
| 2016/0057352 A1* | 2/2016 | Yoneda .............. H04N 5/23287 348/208.4 |
| 2016/0080654 A1 | 3/2016 | Chang et al. |
| 2016/0381289 A1 | 12/2016 | Kim et al. |
| 2017/0359534 A1* | 12/2017 | Li ........................ H04N 5/3572 |

FOREIGN PATENT DOCUMENTS

| | | |
|---|---|---|
| CN | 106060367 A | 10/2016 |
| CN | 106331497 A | 1/2017 |

OTHER PUBLICATIONS

Chinese Office Action dated Mar. 17, 2021, issued in Chinese Application No. 201811093261.7.

* cited by examiner

ELECTRONIC DEVICE FOR CORRECTING IMAGE AND METHOD FOR OPERATING THE SAME

CROSS-REFERENCE TO RELATED APPLICATION(S)

This application is based on and claims priority under 35 U.S.C. § 119(a) to Korean patent application number 10-2017-0120537, filed on Sep. 19, 2017, in the Korean Intellectual Property Office, the disclosure of which is incorporated by reference herein in its entirety.

BACKGROUND

1. Field

The disclosure relates to electronic devices for correcting images using a plurality of cameras and methods for controlling the same.

2. Description of Related Art

Image stabilization (IS) for digital cameras refers to correcting blurry images caused by camera shake or the subject's movement, and this technique is in wide use for cameras or other various electronic devices. IS comes in various types, e.g., optical IS (OIS) and digital IS (DIS). DIS enables the electronic device to compensate for motion blur by digital processing, not by use of optical devices. Techniques to optically mitigate motion blur by moving the lens or sensor or by reducing the exposure time of the sensor may collectively be referred to as OIS.

When an electronic device performs IS in a single- or multi-sensor system, the electronic device may carry out DIS on images obtained using a single sensor. For example, when an obtained image is blurred due to the motion of the electronic device, the electronic device may remove the blurred portion from the margin of the image while determining the rest as a corrected image.

The above information is presented as background information only to assist with an understanding of the disclosure. No determination has been made, and no assertion is made, as to whether any of the above might be applicable as prior art with regard to the disclosure.

SUMMARY

A DIS-equipped electronic device using a single sensor may obtain a raw image by the sensor, remove a portion of the raw image, and magnify the rest of the image to the original size, thereby producing a corrected image. In this case, however, the corrected image may be subjected to a reduced view angle and quality deterioration. As such, single sensor-adopted IS has its own limitations.

Aspects of the disclosure are to address at least the above-mentioned problems and/or disadvantages and to provide at least the advantages described below. Accordingly, an aspect of the disclosure is to provide an electronic device equipped with a plurality of cameras including a wide-angle sensor and a telescopic sensor. The electronic device may secure an image area, which is necessary for correcting an image captured by the telescopic sensor, using an image captured by the wide-angle sensor, mitigating view angle loss or quality deterioration to the telescopic sensor.

Additional aspects will be set forth in part in the description which follows and, in part, will be apparent from the description, or may be learned by practice of the presented embodiments.

In accordance with an aspect of the disclosure, an electronic device is provided. The electronic device includes a first camera having a first view angle, a second camera having a second view angle different from the first view angle, and a processor configured to obtain a first image set for an external object using the first camera and a second image set for the external object using the second camera, determine motion corresponding to the first camera for at least a part of a time during which the first image set and the second image set are obtained, produce a correction area using at least some images of the first image set based on at least the motion corresponding to the first camera, determine a compensation area in at least some images of the second image set based on at least the correction area or the motion corresponding to the first camera, and produce a motion-corrected image for the external object using the correction area and the compensation area.

In accordance with an aspect of the disclosure, a method for controlling an electronic device is provided. The method includes obtaining a first image set for an external object using a first camera having a first view angle and a second image having a second view angle different from the first view angle set for the external object using a second camera, the second camera having a different view angle from the first camera, determining motion corresponding to the first camera for a part of a time during which the first image set and the second image set are obtained, producing a correction area using at least some images of the first image set based on at least the motion corresponding to the first camera, determining a compensation area in at least some images of the second image set based on at least the correction area or the motion corresponding to the first camera, and producing a motion-corrected image for the external object using the correction area and the compensation area.

In accordance an aspect of the disclosure, an electronic device is provided. The electronic device includes a first camera, a second camera having a view angle different from the first camera, and a processor configured to obtain a first image using the first camera and a second image using the second camera and produce a corrected image including a first area corresponding to the first image and a second area corresponding to the second image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
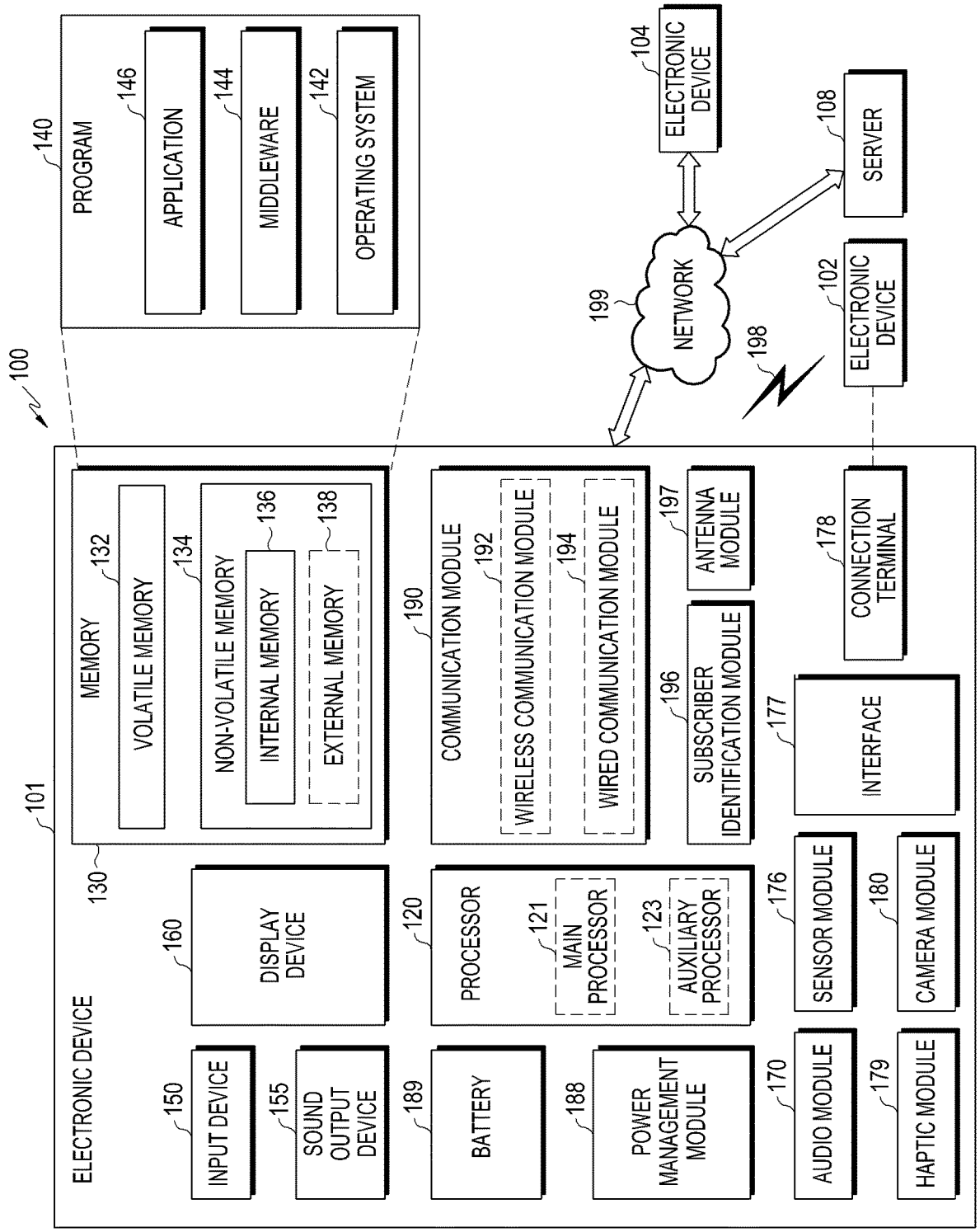
FIG. 1 is a view illustrating a network environment including an electronic device according to an embodiment of the disclosure.

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display device 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) wired or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as bluetooth (BT), Wi-Fi direct, or infrared data association (IrDA)) or a second network 199 (e.g., a long-range communication network, such as a cellular network, the Internet, or a communication network (e.g., local area network (LAN) or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device receiving the request may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
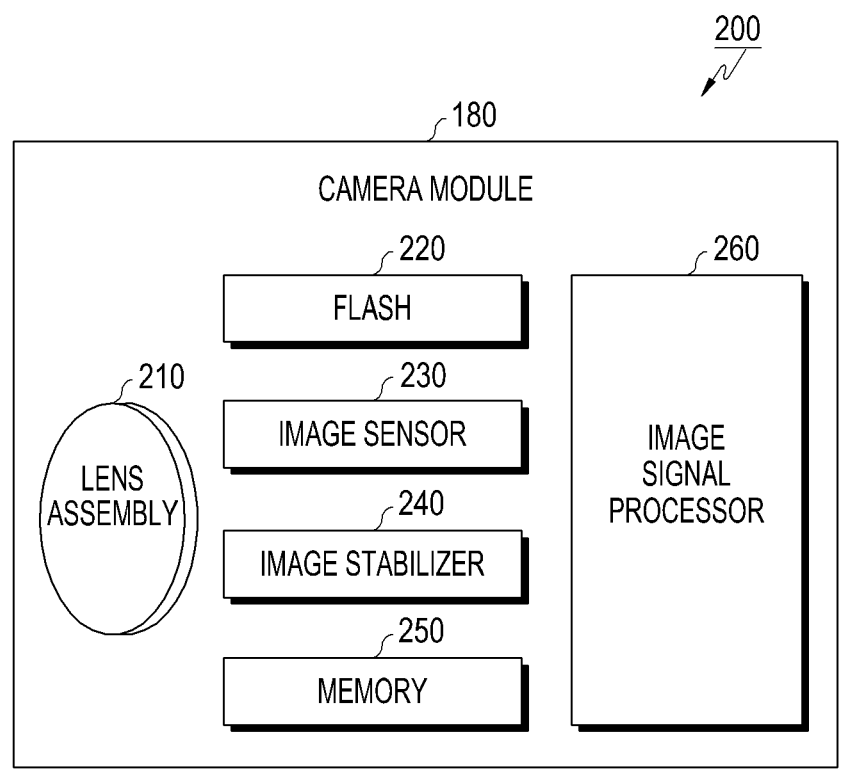
FIG. 2 is a block diagram illustrating a camera module according to an embodiment of the disclosure.

FIG. 2 is a block diagram 200 illustrating a camera module 180 according to an embodiment of the disclosure.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In this case, the camera module 180 may be, e.g., a dual camera, a 360-degree camera, or a spherical camera. The plurality of lens assemblies 210 may have the same lens attribute (e.g., view angle, focal length, auto-focusing, f number, or optical zoom), or at least one lens assembly may have at least one different lens attribute from another lens assembly. The lens assembly 210 may include, for example, a wide-angle lens or a telephoto lens. The flash 220 may emit light that is used to reinforce light from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light transmitted from the object via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented as, e.g., a charged coupled device (CCD) sensor or a complementary metal oxide semiconductor (CMOS) sensor.

The image stabilizer 240 may move in a particular direction, or control (e.g., adjust the read-out timing of), the image sensor 230 or at least one lens included in the lens assembly 210 to at least partially compensate for a negative effect (e.g., image blurring) on a captured image, which is caused by the motion of the camera module 180 or the electronic device 101 including the camera module 180, in response to the motion. According to an embodiment, the image stabilizer 240 may be implemented as, e.g., an optical image stabilizer. The image stabilizer 240 may sense such motion using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, when image capturing is delayed due to shutter lag or multiple images are quickly captured, a raw image obtained (e.g., a high-resolution image) may be stored in the memory 250, and its corresponding copy (e.g., a low-resolution image) may be previewed through the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform image processing (e.g., depth map generation, three-dimensional (3D) modeling, panorama generation, feature point extraction, image mixing, or image compensation (e.g., noise canceling, resolution adjustment, brightness adjustment, blurring, sharpening, or softening)) on an image obtained through the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be transferred to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. When the image signal processor 260 is configured as a separate processor, images processed by the image signal processor 260 may be displayed through the display device 160 as they are or after further processed by the processor 120.

According to an embodiment, the electronic device 101 may include two or more camera modules 180 with different attributes or functions. In this case, at least one of the camera modules 180 may be, e.g., a wide-angle camera or a front camera while at least one other camera module may be a telephoto camera or a rear camera. Or, the at least two or more camera modules may be front cameras or may be rear cameras.

Figure 3:
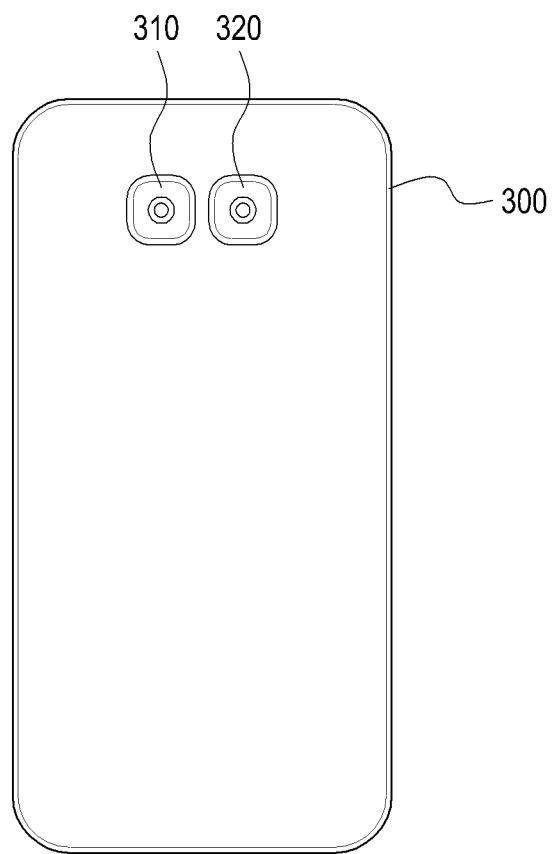
FIG. 3 is a view illustrating examples of a first camera and a second camera according to an embodiment of the disclosure.

FIG. 3 is a view illustrating examples of a first camera and a second camera according to an embodiment of the disclosure.

Figure 4:
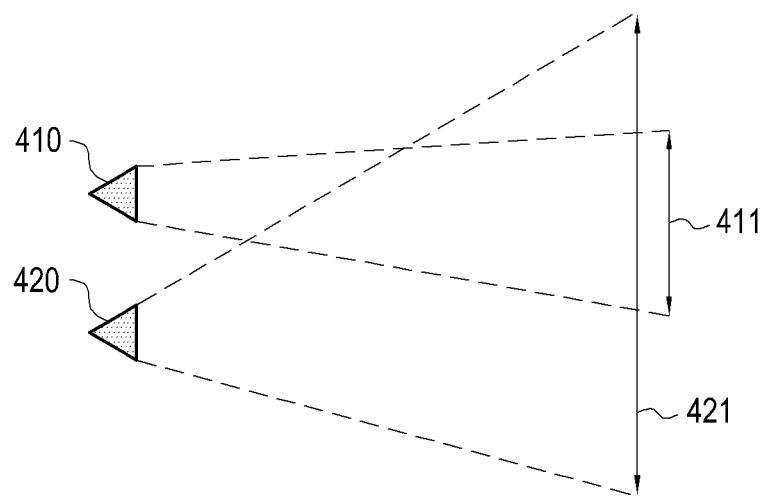
FIG. 4 is a view illustrating examples of view angles of a first camera and a second camera, according to an embodiment of the disclosure.

FIG. 4 is a view illustrating examples of view angles of a first camera and a second camera, according to an embodiment of the disclosure.

Referring to FIG. 3, an electronic device 300 may include a first camera 310 capturing a first image set, a second camera 320 having a different view angle from the first camera 310 and capturing a second image set, and a processor (e.g., the processor 120) producing a motion-corrected image for an external object using the first image set and the second image set, respectively, obtained from the first camera 310 and the second camera 320. According to an embodiment, the first camera 310 may have a longer focal length and a narrow view angle than the second camera 320. As compared with the first camera 310, the second camera 320 may captures images in a wider range. As compared with the second camera 320, the first camera 310 may capture objects positioned farther away.

Referring to FIG. 4, a first camera 410 may have the same configuration as the first camera 310 of FIG. 3, and a second camera 420 may have the same configuration as the second camera 320 of FIG. 3. The first camera 410 and the second camera 420 may face in the same direction and may capture images in the same direction. The view angle 411 of the first camera 410 may be narrower than the view angle 421 of the second camera 420. Where the first camera 410 and the second camera 420 capture images in the same direction, since the second camera 420 may capture the image at a wider view angle as compared with the first camera 410, the image obtained by the second camera 420 may encompass the image obtained by the first camera 410—i.e., the image obtained by the second camera 420 may further have an image that is not shown in the image obtained by the first camera 410. Although not shown in the drawings, the first camera 410 may have the same view angle as the second camera 420. For example, the electronic device 400 may include a plurality of second cameras 420. For example, four or eight second cameras 420 may be deployed around the first camera 410, and the processor (e.g., the processor 120 of FIG. 1) may synthesize images obtained by the plurality of second cameras 420, presenting such an effect as if an image is obtained by a camera with a wider view angle than the first camera 410. Although the following description focuses on adopting one second camera 420 with a wider view angle than the first camera 410, a plurality of second cameras 420 with the same view angle as the first camera 410 may be used to perform IS on the electronic device as set forth above.

Figure 5A:
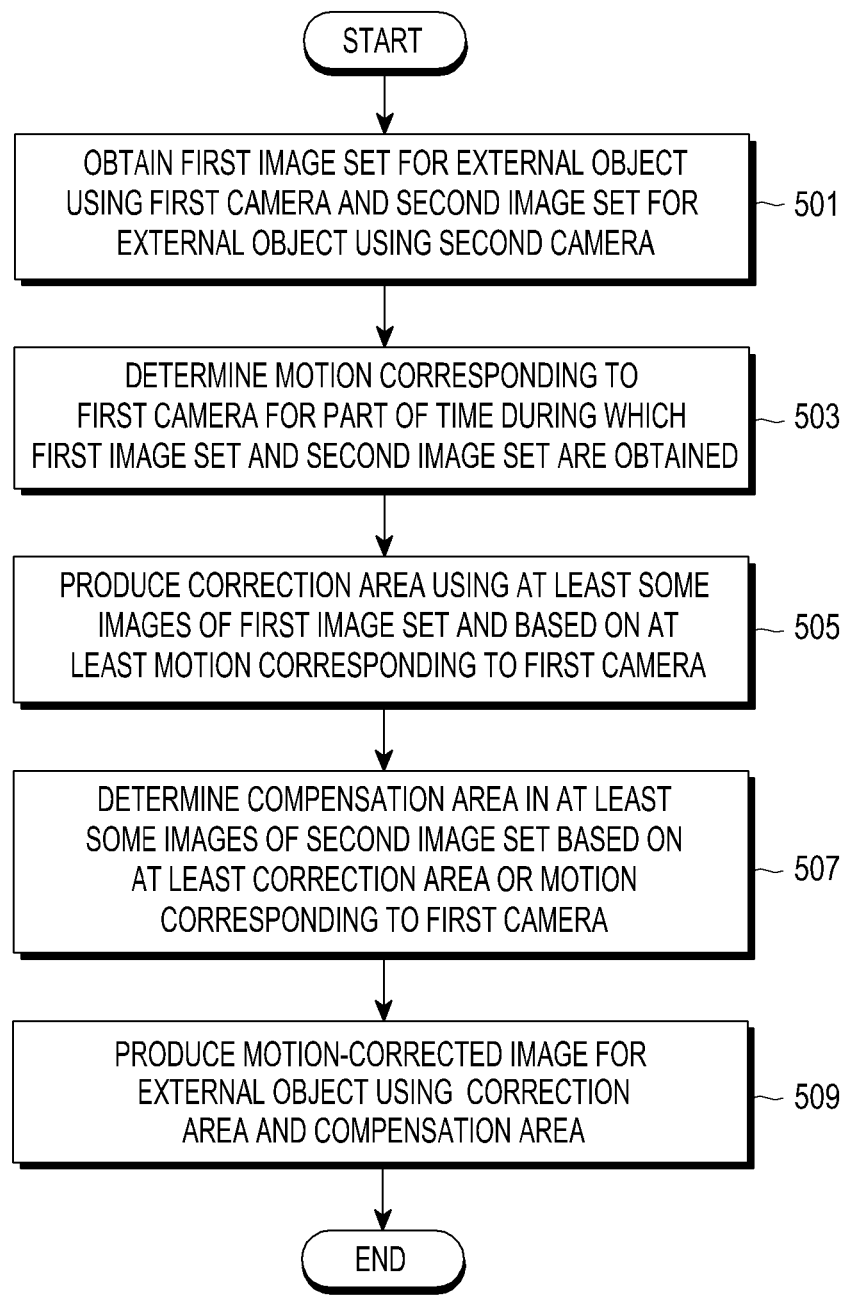
FIGS. 5A, 5B, and 5C are views illustrating a configuration in which an electronic device produces a motion-corrected image for an external object according to an embodiment of the disclosure.
Figure 5B:
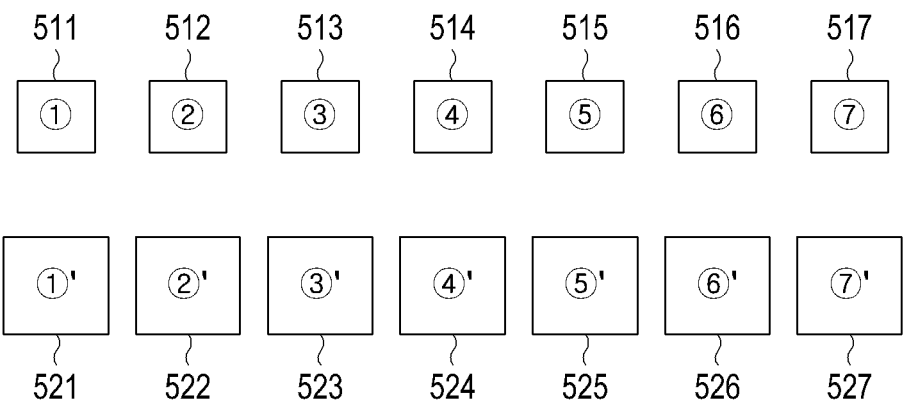
Figure 5C:
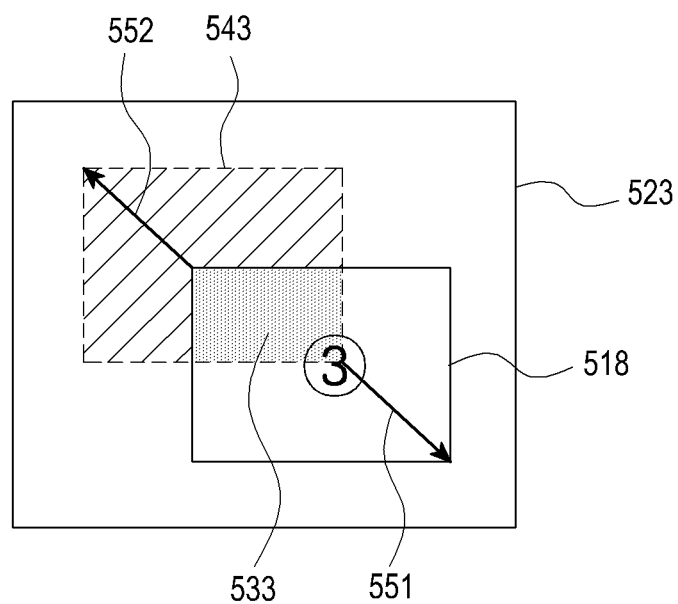

FIGS. 5A, 5B, and 5C are views illustrating a configuration in which an electronic device produces a motion-corrected image for an external object according to an embodiment of the disclosure.

Referring to FIG. 5A, a flowchart illustrating a method in which an electronic device (e.g., the processor 120) produces a motion-corrected image for an external object according to an embodiment. In operation 501, the electronic device (e.g., the electronic device 101 or the processor 120) may obtain a first image set for an external object using a first camera.

Referring to FIG. 5B, the electronic device 101 may obtain image frames (e.g., image frames 511-527) constituting at least one image set. For example, the electronic device 101 may continuously capture the image frames using the first camera. Alternatively, the electronic device 101 may obtain, via the communication module, image frames captured by another electronic device with a plurality of cameras.

In operation 503, the electronic device (e.g., the electronic device 101 or the processor 120) may determine the motion of the electronic device 101. For example, the electronic device 101 may determine motion corresponding to the first camera 310 connected to the electronic device 101. For example, the electronic device 101 may determine differences between the plurality of image frames and may determine the motion based on the determined differences. For example, the electronic device 101 may determine a difference between a third image frame 513 and a fourth image frame 514. The electronic device 101 may determine the motion based on a distance (e.g., pixel distance) between the position of a first object in the third image frame 513 and a first object in the fourth image frame 514. The electronic device 101 may obtain coordinates related to the position of the first object in the third image frame 513 and coordinates related to the position of the first object in the fourth image frame 514 and may determine the motion based on a difference between the obtained coordinates. The electronic device 101 may determine the motion for at least a part of the time during which the electronic device 101 obtains the first image set and the second image set, and the partial time may have a value preset by the processor or the user. According to an embodiment, the processor may obtain motion information about the electronic device 101 using sensor information obtained from a sensor electrically connected with the processor or an image sensor electrically connected with the first camera 310 and the second camera 320. The processor may determine the motion of the electronic device 101 based on the obtained motion information.

In operation 505, the electronic device (e.g., the electronic device 101 or the processor 120) may produce a correction area using at least some images of the first image set and based on at least the motion corresponding to the first camera. Alternatively, rather than using the first image set, the electronic device 101 may produce a correction area using some image frames included in an image set received from another electronic device including a plurality of cameras and electrically connected with the electronic device 101 and sensor information received from a sensor electrically connected with the first camera. For example, the electronic device 101 may generate a correction area to produce a motion-corrected image for the external object by combining with a compensation area to be obtained in operation 507 based on the motion corresponding to the first camera determined in operation 503.

Referring to FIG. 5C, the electronic device may generate a correction area 533 from a third image frame 513 which is included in the first image set and where the motion corresponding to the first camera occurs. The electronic device 101 may determine an area common to the pre-motion image frame as the correction area 533, based on the direction of the motion vector 551 corresponding to the first camera.

In operation 507, the electronic device (e.g., the electronic device 101 or the processor 120) may determine a compensation area in at least some images of the second image set based on at least the correction area or the motion corresponding to the first camera. The electronic device 101 may determine the compensation area for performing IS on the rest except for the correction area that is removed from at least some images of the first image set. For example, the processor may determine the compensation area from a third image frame 523 of the second image set based on the correction area determined in a third image frame 513 of the first image set. Alternatively, without using the third image frame 513 of the first image set, the processor may determine the compensation area in the third image frame 523 of the second image set based on the motion information corresponding to the first camera received from the first camera. For example, the processor may obtain the motion information from the image sensor included in the first camera and determine the compensation area. Referring to FIG. 5C, the processor may determine a compensation area 543 in the third image frame 523 of the second image set to correct the motion blur of the image frame 518 of the first image set due to the motion. For example, the processor may set the compensation area 543 in the direction of the inverse vector 552 of the motion vector 551 in the direction that the motion of the electronic device 101 occurs, from the third image frame 523 of the second image set. Since the image obtained by the second camera has a wider view angle than the image obtained by the first camera, the compensation area 543 is included in the image obtained by the second camera, but might not be in the image obtained by the first camera.

According to an embodiment, the correction area 533 may be larger than the compensation area 543. The processor 120, upon determining that the electronic device 101 moves by a predetermined degree or more, may abstain from performing IS. The compensation area 543 may be combined with a corner of the correction area 533, and since IS is performed only when the electronic device 101 moves by less than the predetermined degree, the correction area 533 may be larger than the compensation area 543.

In operation 509, the electronic device 101 (e.g., the processor 120) may produce a motion-corrected image for the external object using a correction area corresponding to an image frame included in the first image set and a compensation area corresponding to an image frame included in the second image set. Referring to FIG. 5B, the electronic device 101 may produce a motion-corrected image for an external object using the correction area of the third image frame 513 of the first image set and the compensation area of the third image frame 523 of the second image set. Referring to FIG. 5C, the electronic device 101 may produce one image by combining the correction area 533 determined in the image frame 518 included in the first image set and the compensation area 543 determined in the third image frame 523 included in the second image set. In this case, at least part of the compensation area 543 might not be included in the image frame 518 obtained by the first camera.

Figure 6A:
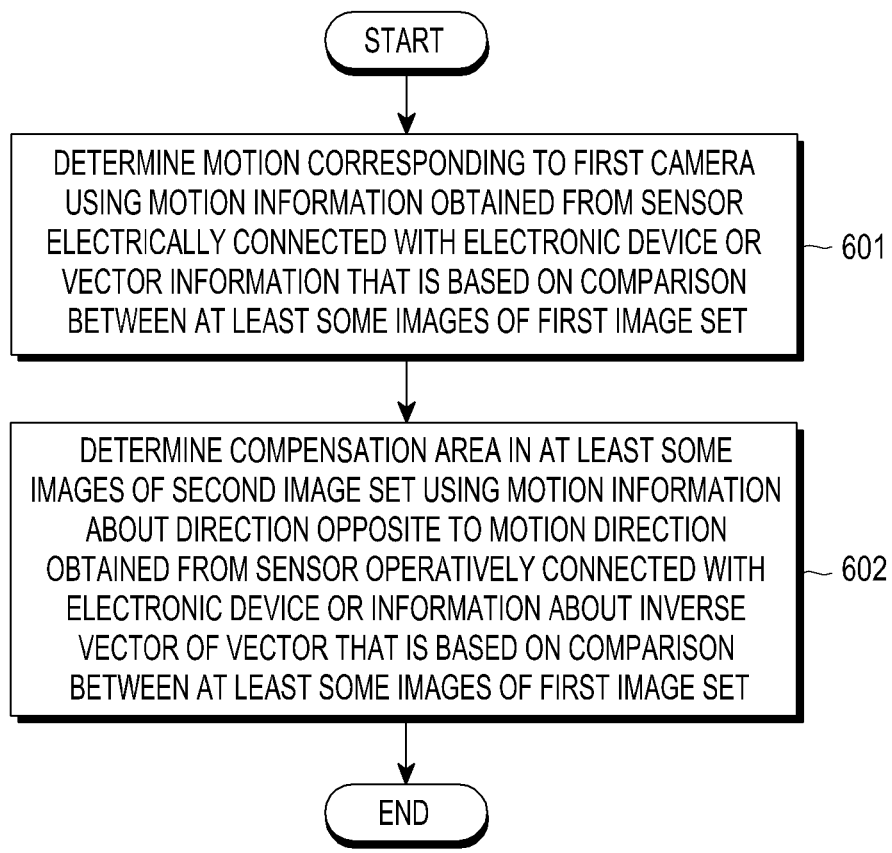
FIGS. 6A, 6B, and 6C are views illustrating a configuration in which an electronic device sets a compensation area according to an embodiment of the disclosure.
Figure 6B:
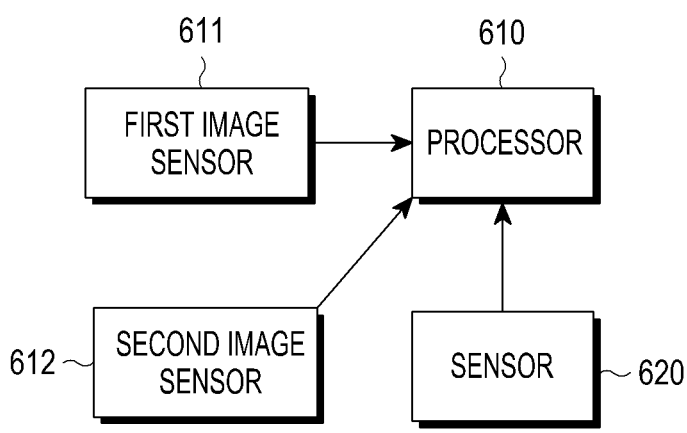
Figure 6C:
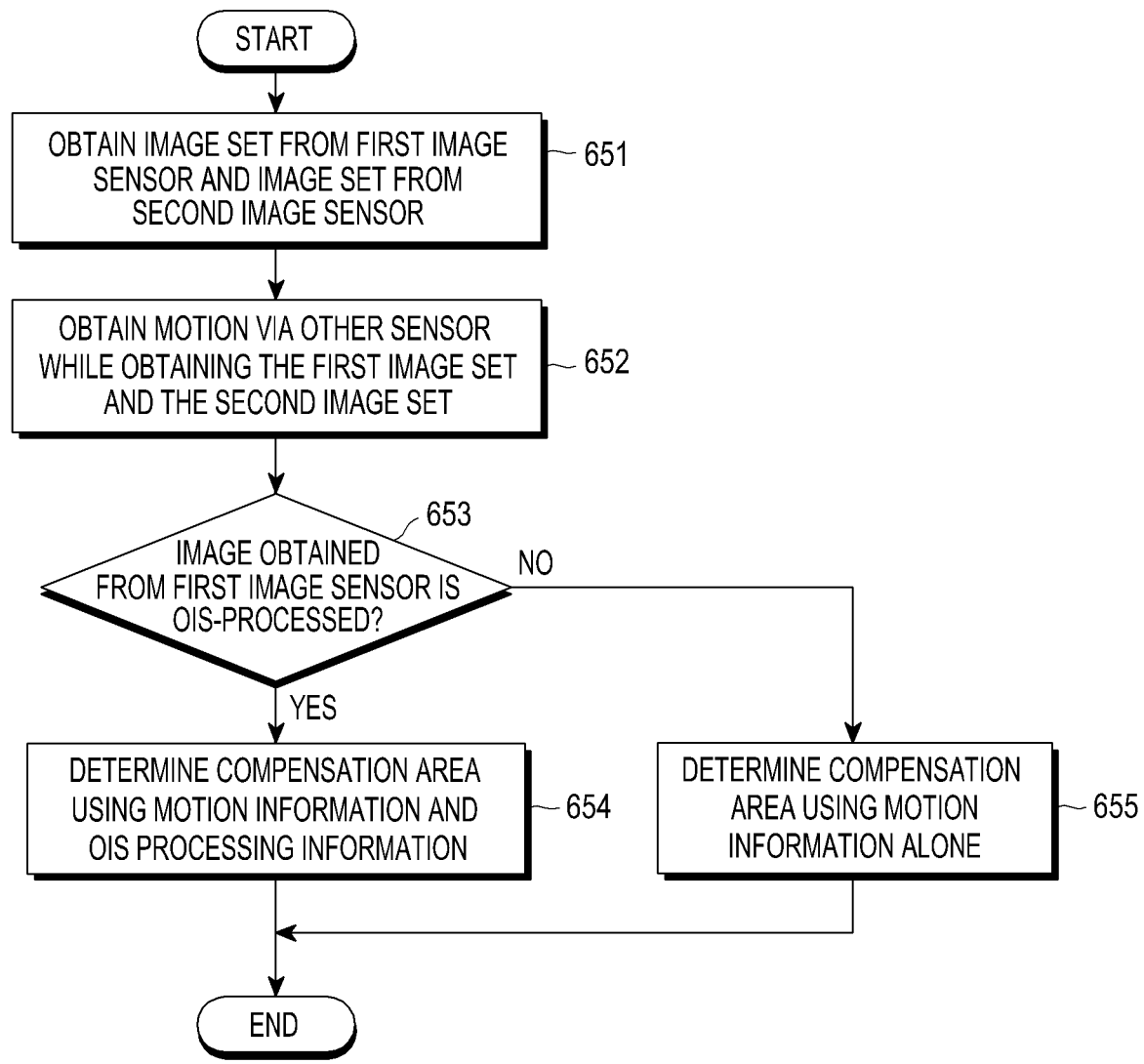

FIGS. 6A, 6B, and 6C are views illustrating a configuration in which an electronic device sets a compensation area according to an embodiment of the disclosure.

Referring to FIG. 6A, a flowchart illustrating an example of a method in which an electronic device (e.g., the electronic device 101 or the processor 120) sets a compensation area according to an embodiment.

Referring to FIG. 6B, a block diagram illustrating an example of the electronic device (e.g., the electronic device 101) to set the compensation area.

In operation 601, the electronic device (e.g., the electronic device 101 or the processor 120) may determine motion corresponding to the first camera using motion information obtained from a sensor operatively connected with the electronic device 101 or vector information that is based on comparison between at least some images of the first image set. According to an embodiment, the electronic device may include a processor 610 to produce a motion-corrected image for an external object, a first image sensor 611 electrically connected with the first camera to provide motion information about an image included in the first image set to the processor, a second image sensor 612 electrically connected with the second camera to provide motion information about an image included in the second image set to the processor, and a sensor 620 to determine the motion of the electronic device 101. The processor 610 may have the same configuration as the processor 120 of FIG. 1. The sensor 620 may have the same configuration as the sensor module 176 of FIG. 1 and may include a motion sensor or gyro sensor to determine the motion of the electronic device 101. The processor 610 of the electronic device may compare some images of the first image set obtained by the first image sensor 611. The processor 610 may extract vector information about the motion of the electronic device to determine the motion of the electronic device 101, or the processor 610 may determine the motion of the electronic device using the motion information about the electronic device obtained from the sensor 620.

According to an embodiment, the electronic device (e.g., the electronic device 101 or the processor 120) may detect the motion corresponding to the second camera and may determine a compensation area using the motion corresponding to the first camera and the motion corresponding to the second camera.

Referring to FIG. 6B, the processor 610 may determine the compensation area from some images of the second image set using the motion information corresponding to the first camera and the motion information corresponding to the second camera. Like the motion information corresponding to the first camera, the motion information corresponding to the second camera may be obtained using the motion information about the electronic device 101 obtained from the sensor 620 and the vector information about the motion obtained by comparing some images of the second image set obtained from the second image sensor 612.

In operation 602, the electronic device (e.g., the electronic device 101 or the processor 120) may determine the compensation area from some images of the second image set using motion information about the direction opposite to the direction of the motion obtained from sensors operatively connected with the electronic device 101 or information about the inverse vector of the vector that is based on comparison between at least some images of the first image set. As described above in connection with FIG. 5C, the electronic device 101 may determine the compensation area contained in the image of the second image set, based on the inverse vector of the vector obtained by the first image sensor 611 or the motion information about the direction opposite to the direction of the motion of the electronic device obtained from the sensor 620. The processor 610 may determine the compensation area based on at least one of the inverse vector information obtained from the first image sensor 611, the inverse vector information obtained from the second image sensor 612, or the vector information about the direction opposite to the direction of the motion obtained from the sensor 620.

Referring to FIG. 6C, a flowchart illustrating an example of a method in which the electronic device (e.g., the electronic device 101 or the processor 120) sets a compensation area depending on whether to performing an OIS process on the first image set and the second image set.

In operation 651, the electronic device (e.g., the electronic device 101 or the processor 120) may obtain the first image set from the first image sensor and the second image set from the second image sensor. The image of the first image set obtained from the first image sensor may have a narrower view angle than the image of the second image set obtained from the second image sensor.

In operation 652, the electronic device (e.g., the electronic device 101 or the processor 120) may obtain the motion of the electronic device via another sensor while obtaining the first image set and the second image set. Referring to FIG. 6B, the processor 610 (e.g., the processor 120) may obtain information about motion to determine a compensation area using the first image sensor 611 and the sensor 620 or using the first image sensor 611, the second image sensor 612, and the sensor 620 while obtaining the image sets from the first image sensor 611 and the second image sensor 612.

In operation 653, the electronic device (e.g., the electronic device 101 or the processor 120) may identify whether the image obtained from the first image sensor 611 is an OIS-processed image. OIS denotes image stabilization technology or may mean any technique to prevent or fix motion blurs caused by the motion of the electronic device that may arise when the electronic device is unstably rested or the user grabs the electronic device. The first image sensor 611 or the second image sensor 612 may have OIS functionality. Depending on having OIS functionality, the first image sensor 611 or the second image sensor 612 may transmit the OIS-processed image set to the processor 610. Where the processor receives the image set from the image sensor with the OIS functionality, failure to reflect as much motion information as the OIS processing in determining the compensation area might not present a desired image despite combining the correction area and the compensation area. According to an embodiment, the electronic device may determine whether the image frame included in the image set obtained from the first image sensor and the image frame included in the image set obtained from the second image sensor are OIS-processed images. For example, the processor 610 may obtain vector information between the moved image frames using the first image sensor 611 alone or may obtain vector information about the motion of the electronic device using both the first image sensor 611 and the second image sensor 612.

In operation 654, where the image that the electronic device (e.g., the electronic device 101 or the processor 120) obtains from the first image sensor is an OIS-processed image, the processor 610 may determine the compensation area based on the OIS processing information and the motion information about the electronic device obtained from the first image sensor 611 and the sensor 620. Alternatively, the processor 610 may determine the compensation area based on the OIS processing information obtained from each of the first image sensor 611 and the second image sensor 612 and the motion information about the electronic device obtained from the first image sensor 611, the second image sensor 612, and the sensor 620. In operation 655, upon determining that the image obtained from the first image sensor 611 is not an OIS-processed image, the processor 610 may determine the compensation area using the obtained motion information alone. The processor 610 may determine the correction area by reflecting all the motion caused by, e.g., hand shakes and may determine the compensation area based on the determined correction area.

Figure 7A:
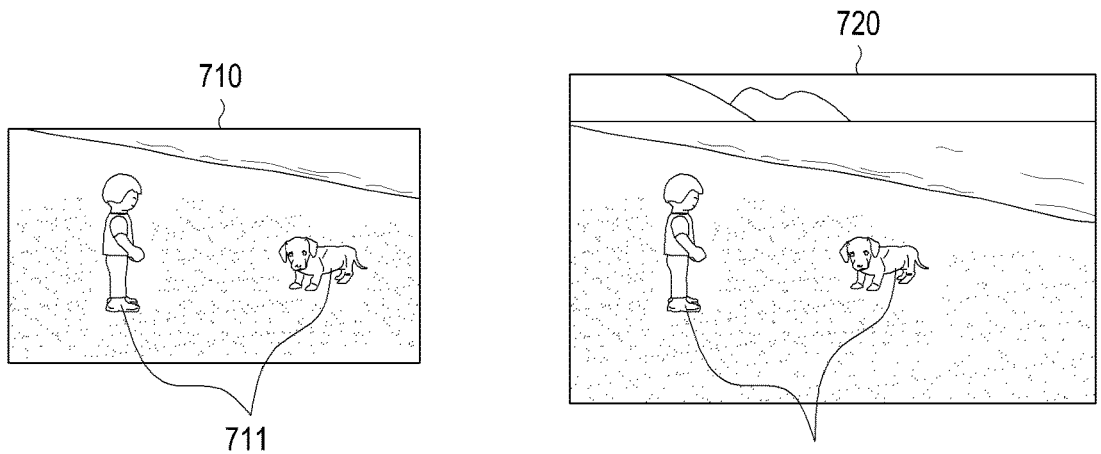
FIGS. 7A, 7B, and 7C are views illustrating a configuration in which an electronic device performs image stabilization (IS) using a first camera and a second camera according to an embodiment of the disclosure.
Figure 7B:
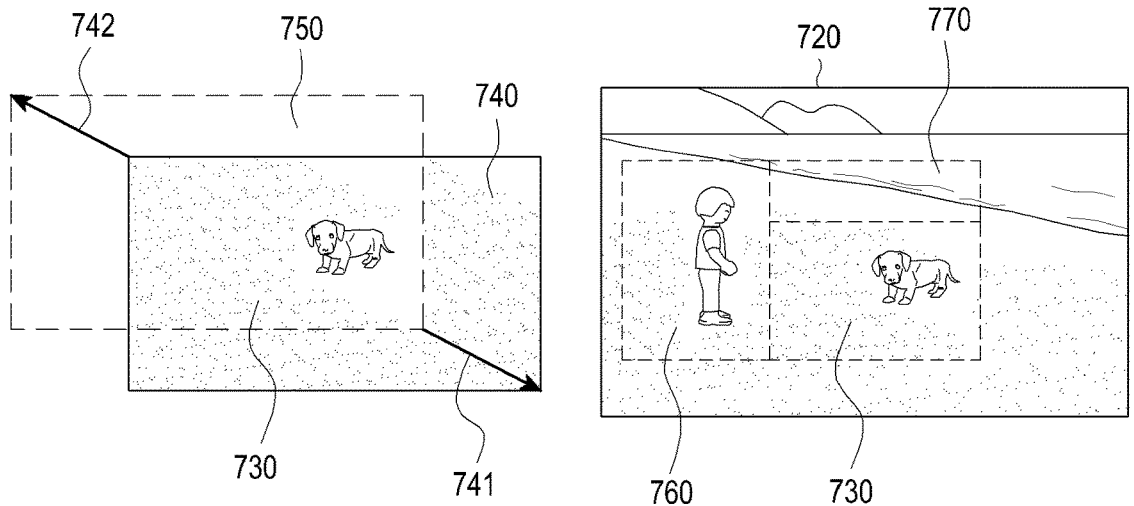
Figure 7C:
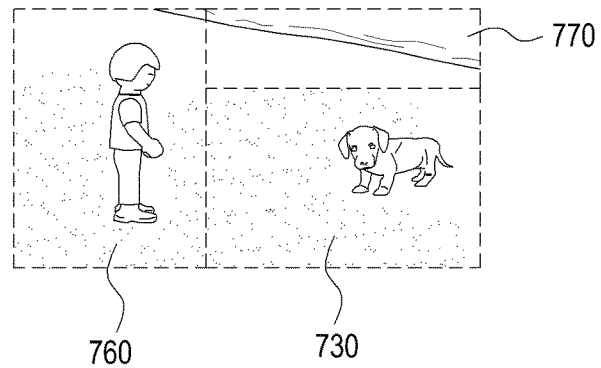

FIGS. 7A, 7B, and 7C are views illustrating a configuration in which an electronic device (e.g., the electronic device 101 or the processor 120) performs IS using a first camera and a second camera according to an embodiment of the disclosure.

Referring to FIG. 7A, a view illustrating examples of images obtained using the first camera and the second camera.

According to an embodiment, the electronic device (e.g., the processor 120) may obtain an image 710 of a first image set from the first camera and an image 720 of a second image set from the second camera. The image 710 of the first image set may have a narrower view angle and a smaller depth than the image 720 of the second image set. The image 720 of the second image set may include an area that is not included in the image 710 of the first image set. The area which is not included in the image 710 of the first image set but is included in the image 720 of the second image set may be used to determine a compensation area when the image 710 of the first image set is moved.

Referring to FIG. 7B, a view illustrating an example of a configuration for determining a correction area and a compensation area when the image 710 of the first image set and the image 720 of the second image set move.

According to an embodiment, the electronic device (e.g., the electronic device 101 or the processor 120) may obtain motion information corresponding to the first camera. The electronic device 101 may obtain both motion information corresponding to the first camera and motion information corresponding to the second camera.

Referring to FIG. 7B, the processor may determine a shaking direction 741 of the image 710 of the first image set and a correcting direction 742 that is opposite to the shaking direction 741. The processor may determine a correction area 730 from the image 710 of the first image set based on vector information corresponding to the shaking direction 741 of the image 710 of the first image set. The correction area 730 may be determined based on the information about the shaking direction 741 of the image 710 of the first image set, or in determining the correction area 730, information about the shaking direction of the image 720 of the second image set may further be used. The electronic device 101 may remove the area 740 except for the correction area 730 from the image 710 of the first image set. The electronic device 101 may set an area 750 corresponding to a compensation area to be obtained from the image 720 of the second image set based on the vector corresponding to the correcting direction 742 and the correction area 730 of the image 710 of the first image set. The electronic device 101 may determine compensation areas 760 and 770 based on the area corresponding to the correction area 730 in the image 720 of the second image set. The electronic device 101 may set the compensation areas 760 and 770 by splitting into blocks, but this is merely an example, and determining the compensation areas 760 and 770 is not limited thereto.

According to an embodiment, without using the first image sensor connected to the first camera and the second image sensor connected to the second camera, the electronic device (e.g., the electronic device 101 or the processor 120) may produce a motion-corrected image by correcting the motion of an object 711 present inside the image 710 of the first image set or the image 720 of the second image set based on the position of the object 711. For example, the electronic device may identify the motion of the object 711 based on coordinates of the object 711 in the image 710 of the first image set or the image 720 of the second image set. Alternatively, the electronic device may identify the position of the object 711 by continuously tracking the object 711 and compare the tracked position with the position of the object 711 a preset time before, identifying the motion of the object. Upon identifying that the position of the object 711 has been moved, the processor may determine the correction area 730 from the image 710 of the first image set based on the information about the moved position and may determine the compensation areas 760 and 770 from the second image set using the motion information and the correction area. Determining the correction area and compensation areas has been described above in detail, and no further description thereof is given below.

FIG. 7C is a view illustrating an example of a configuration in which an electronic device (e.g., the electronic device 101 or the processor 120) produces a motion-corrected image using a correction area and a compensation area.

Referring to FIG. 7C, the electronic device (e.g., the electronic device 101 or the processor 120) may produce a motion-corrected image by combining the correction area 730 determined in the image 710 of the first image set and the compensation areas 760 and 770 determined in the image 720 of the second image set. For example, the electronic device 101 may produce the motion-corrected image by combining the correction area 730 and the compensation areas 760 and 770 in block units. The correction area 730 and the compensation areas 760 and 770, which are those captured by the first camera and the second camera, may differ in depth or curve from each other. Correcting the depth or curve is described below in detail with reference to FIGS. 11A, 11B, 12A, and 12B.

Figure 8A:
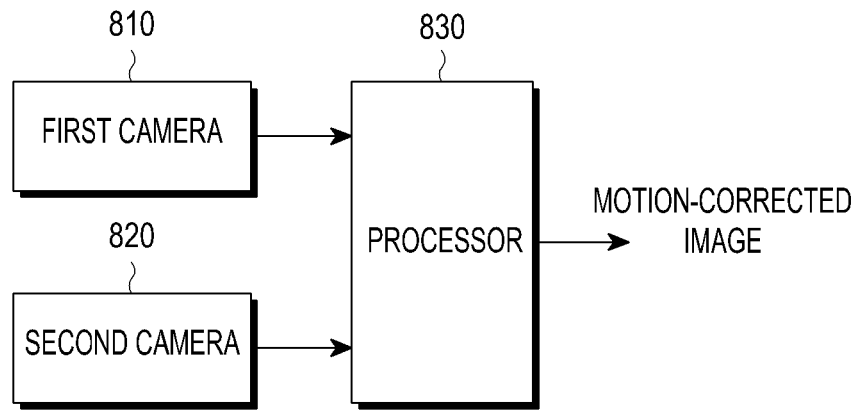
FIGS. 8A, 8B, and 8C are block diagrams illustrating a configuration in which an electronic device produces a motion blur-corrected telescopic image according to an embodiment of the disclosure.
Figure 8B:
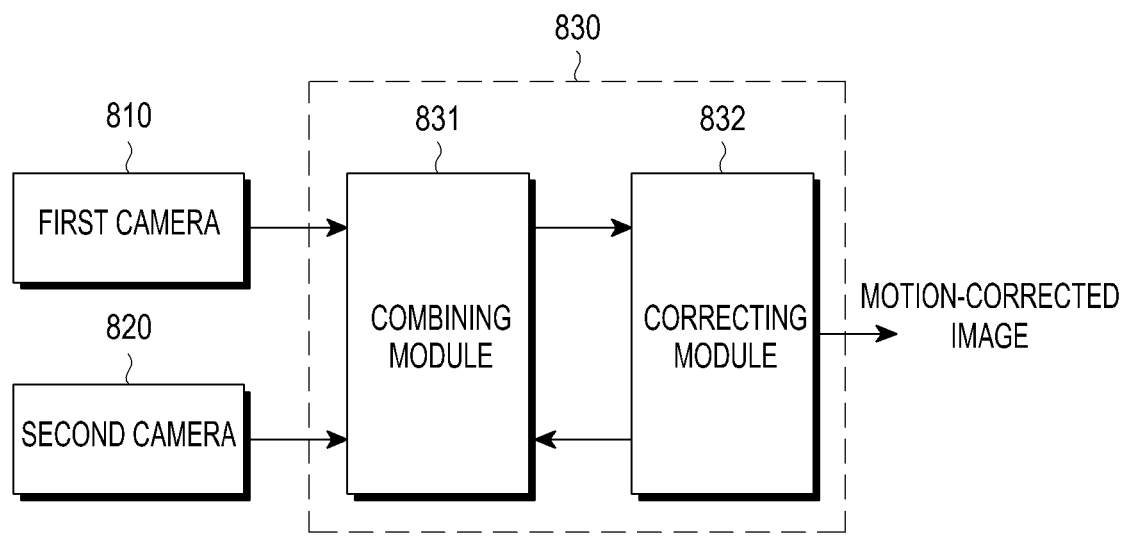
Figure 8C:
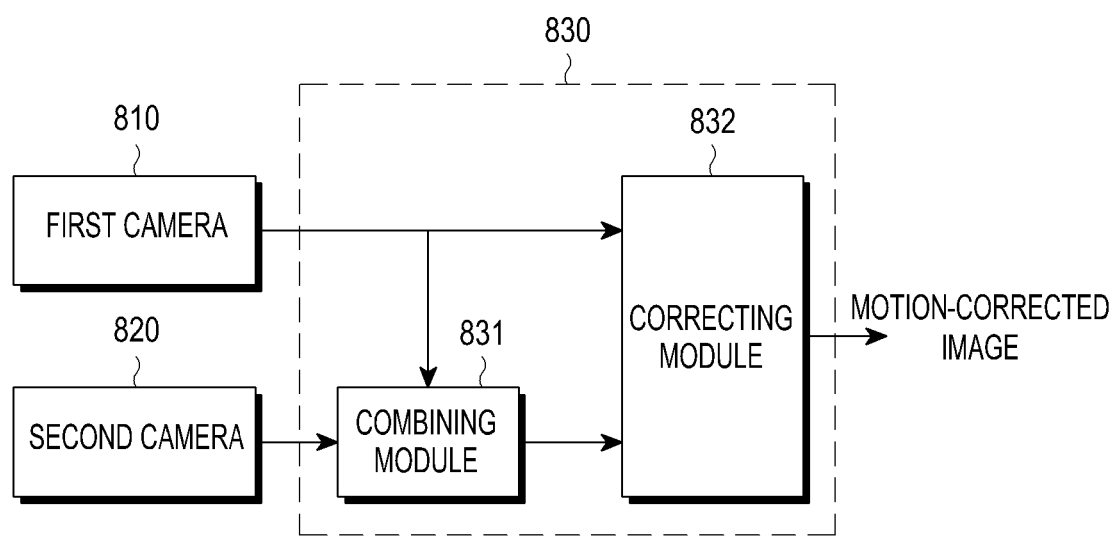

FIGS. 8A, 8B, and 8C are block diagrams illustrating a configuration in which an electronic device (e.g., the electronic device 101 or the processor 120) performs IS using a first camera and a second camera according to an embodiment of the disclosure.

Referring to FIG. 8A, according to an embodiment, an electronic device (e.g., the electronic device 101) may include a first camera 810, a second camera 820, and a processor 830. The processor 830 may have the same configuration as the processor of FIG. 1. A first image set obtained from the first camera 810 may be a telescopic image set, and a second image set obtained from the second camera 820 may be a wide-angle image. The processor 830 may obtain images from the first camera 810 or the second camera 820 and may produce motion information by comparing the images. The processor 830 may obtain the motion information from the first camera 810 alone or from the second camera 820 alone.

Referring to FIGS. 8B and 8C, the electronic device (e.g., the electronic device 101 or the processor 120) may include the first camera 810, the second camera 820, and the processor 830. The processor 830 may include a combining module 831 and a correcting module 832. The combining module 831 and the correcting module 832 may be, e.g., logic modules. Thus, the operations performed by the combining module 831 and the correcting module 832 may be performed by the processor 830 (e.g., the processor 120). According to an embodiment, at least one of the combining module 831 or the correcting module 832 may be implemented in hardware inside the processor 830. Referring to FIG. 8B, the combining module 831 of the processor 830 may obtain image sets from the first camera 810 and the second camera 820 and may receive motion information from at least one of the first camera 810 or the second camera 820. The combining module 831 may produce overall motion information by combining the received motion information and transmit the produced motion information to the correcting module 832. The correcting module 832 may produce a motion-corrected image using the motion information received from the combining module 831 and the image sets obtained from the first camera and the second camera.

Referring to FIG. 8C, the first camera 810 may transmit the image set and motion information to both the combining module 831 and the correcting module 832 in the processor 830, and the second camera 820 may transmit the image set and motion information to the combining module 831 alone. The combining module 831 may produce the overall motion information by combining the motion information obtained from the first camera 810 and the second camera 820, and the correcting module 832 may produce a motion-corrected image based on the motion information received from the first camera 810 and the motion information received from the combining module 831.

Figure 9A:
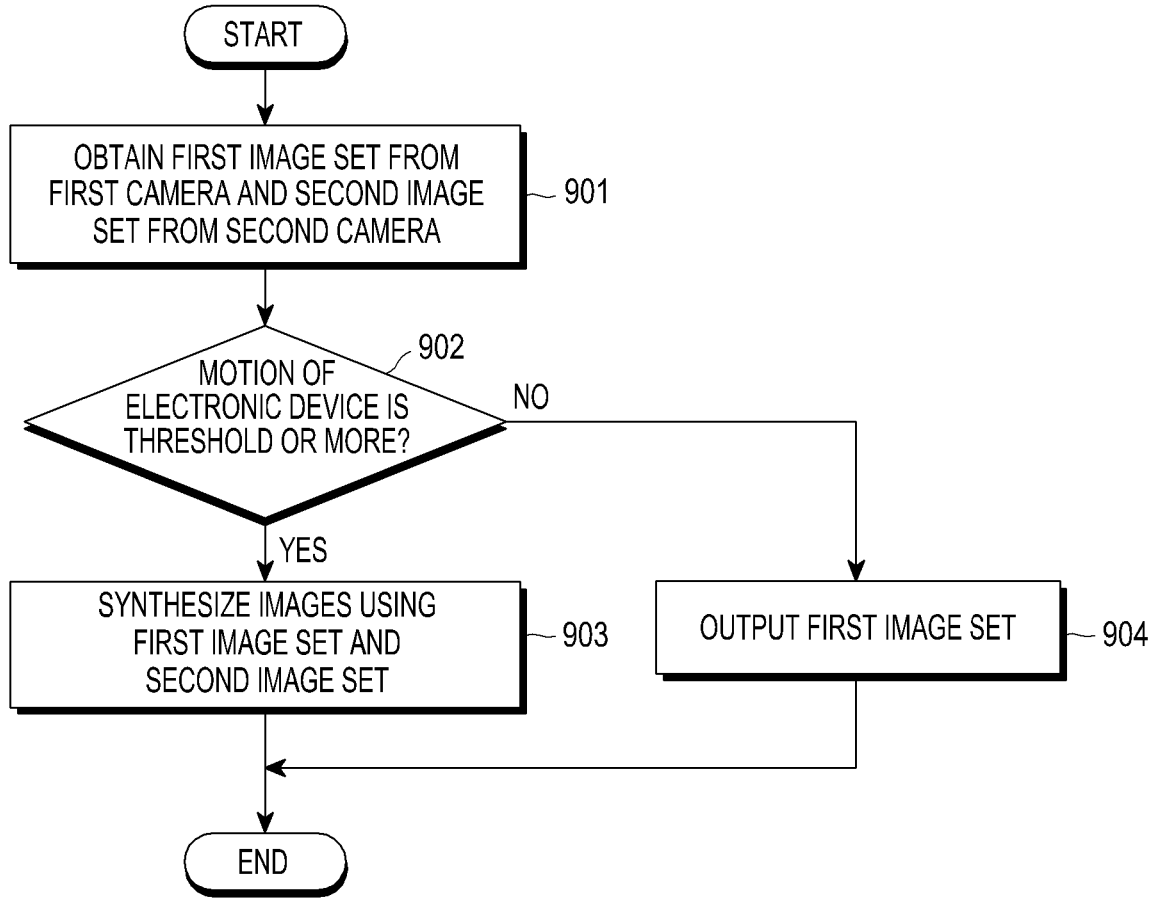
FIGS. 9A and 9B are views illustrating a configuration in which an electronic device performs IS when the electronic device does not move, according to an embodiment of the disclosure.
Figure 9B:
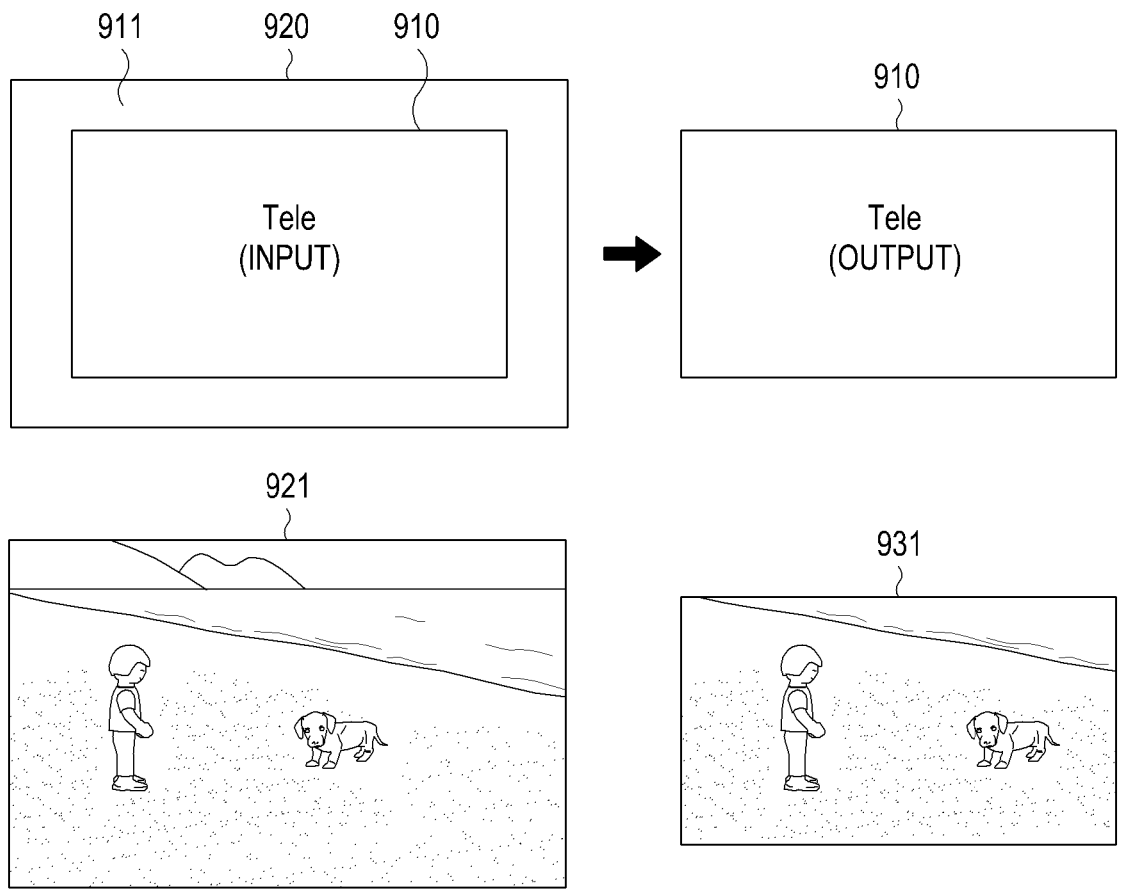

FIGS. 9A and 9B are views illustrating an example of a configuration in which an electronic device (e.g., the electronic device 101 or the processor 120) performs IS when there is no shake according to an embodiment of the disclosure.

Referring to FIG. 9A, in operation 901 the electronic device (e.g., the electronic device 101 or the processor 120) may obtain the first image set and the second image set from the first camera and the second camera, respectively. For example, the processor (e.g., the processor 120) may obtain an image 910 of the first image set and an image 920 of the second image set from the first camera and the second camera, respectively. The image 920 of the second image set may include an area 911 that the image 910 of the first image set does not include, and the processor may set the area 911 as a margin for the image 910 of the first image set. For example, an image 921 entered before the processor performs image correction may be an image in which the image 910 of the first image set and the image 920 of the second image set are overlapping combined with each other.

In operation 902, the electronic device (e.g., the electronic device 101 or the processor 120) may determine whether the motion of the electronic device 101 is a threshold or more. The electronic device 101 may identify whether the electronic device moves based on information received from a sensor (e.g., the sensor module 176) coupled with the electronic device and may determine whether the motion of the electronic device is the threshold or more. Upon detecting the motion of the electronic device, the electronic device 101 may set a threshold for the motion of the electronic device depending on whether it is within a range correctable by, e.g., OIS. In operation 903, upon determining that the motion of the electronic device is the threshold or more, the electronic device 101 may produce a motion-corrected image using both the image 910 of the first image set and the image 920 of the second image set. For example, the electronic device 101 may determine a correction area from the image 910 of the first image set and determine a compensation area from the image 920 of the second image set based on the correction area and motion information. The electronic device 101 may produce a motion-corrected image based on the determined correction area and compensation area. Configurations to produce a motion-corrected image has been described above in detail, and no further description thereof is given.

In operation 904, upon determining that the motion of the electronic device is less than the threshold, the electronic device (e.g., the electronic device 101 or the processor 120) may output the image 910 of the first image set, as it is, as the corrected image.

Referring to FIG. 9B, the processor may remove the area 911 which is not in the image 910 of the first image set, producing the images 910 and 931 in the first image set as the corrected image. According to an embodiment, the electronic device 101 sets some of the images of the second image set obtained from the second camera as the margin without separately setting a margin from the image of the first image set obtained from the first camera, thus preventing a loss from occurring in the images 910 and 931 in the first image set in performing image correction when no shake occurs in the electronic device.

Figure 10A:
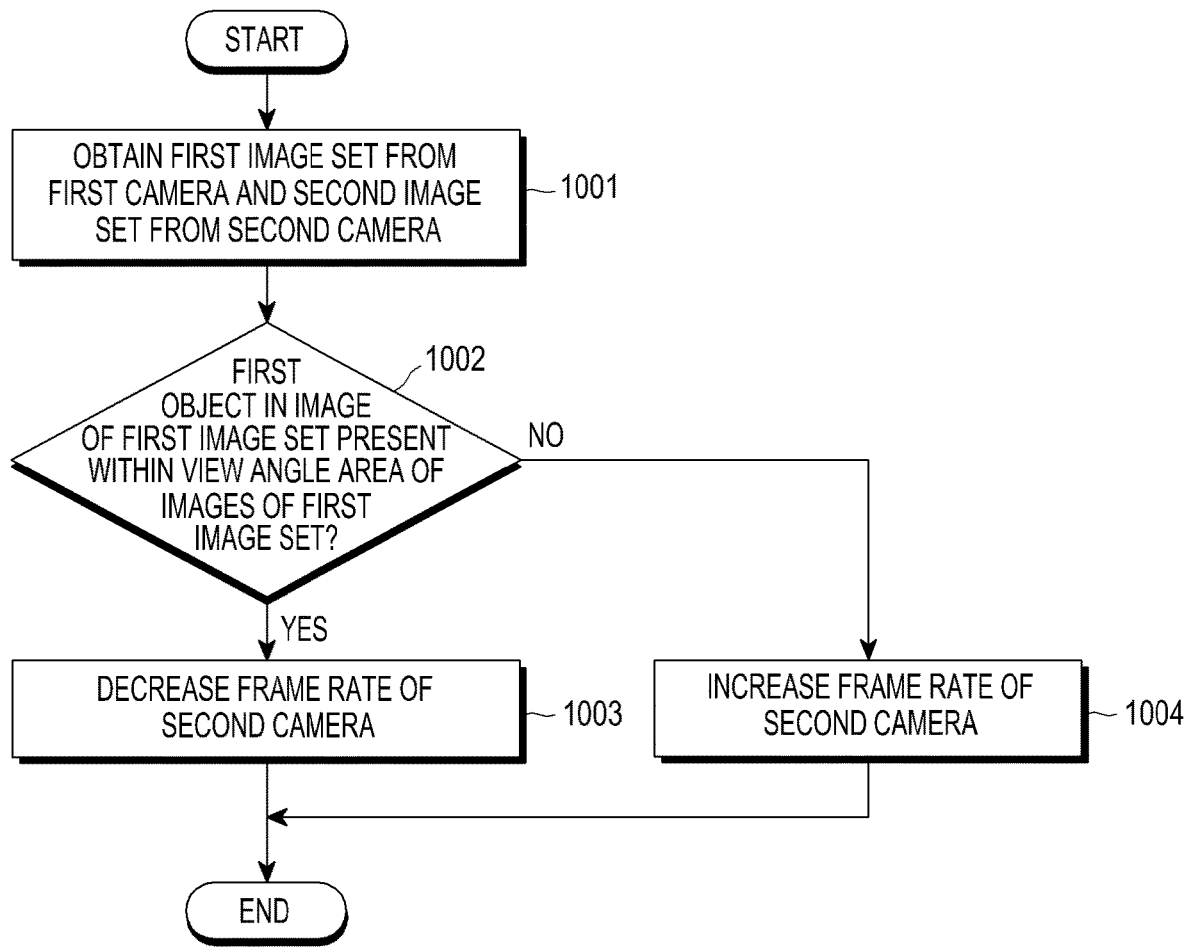
FIGS. 10A and 10B are views illustrating a configuration in which an electronic device produces a motion-corrected image by controlling a frame rate of a second camera according to an embodiment of the disclosure.
Figure 10B:
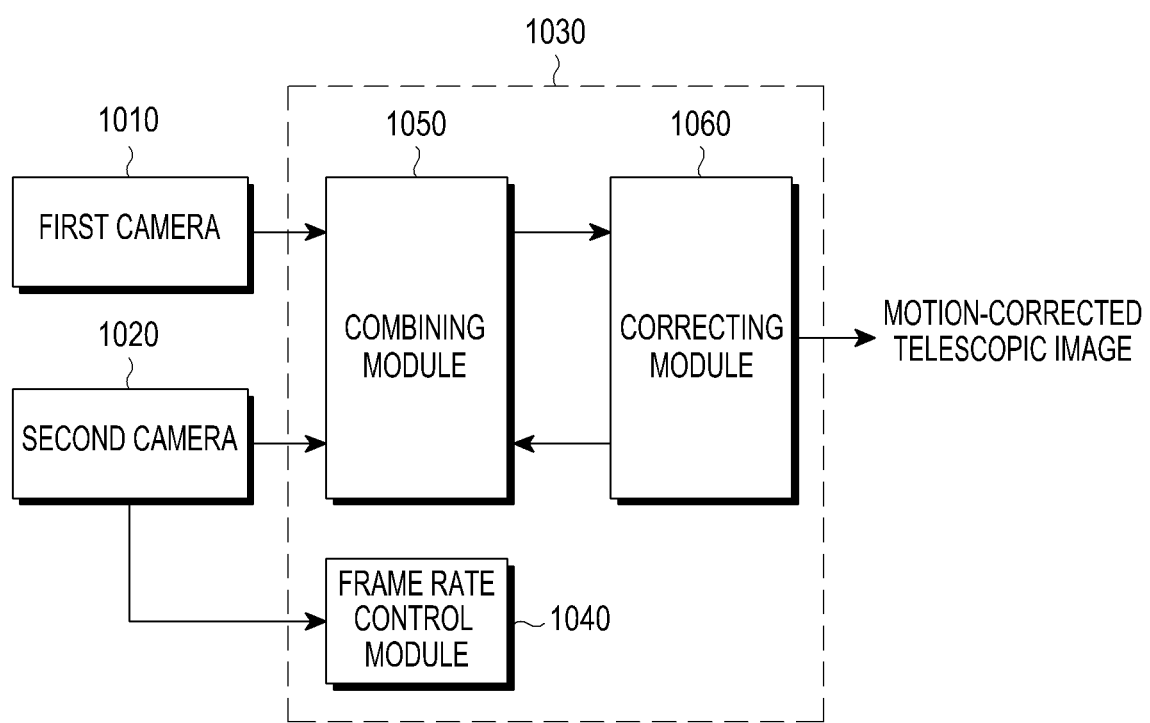

FIGS. 10A and 10B are views illustrating a configuration in which an electronic device (e.g., the electronic device 101 or the processor 120) produces a motion-corrected image by controlling a frame rate of a second camera according to an embodiment of the disclosure.

According to an embodiment, the electronic device (e.g., the electronic device 101 or the processor 120) may adjust the frame rate obtained from each optical system to overcome defects that may arise due to differences between the telescopic image obtained from the first camera and the wide-angle image obtained from the second camera. The frame rate denotes the number of image frames obtained by the first camera or the second camera within a unit time, and the 'frame rate is high' may mean that more images may be obtained within the unit time. The electronic device 101 may adjust the frame rate of each of the first camera and the second camera.

In operation 1001, the electronic device (e.g., the electronic device 101 or the processor 120) may obtain the first image set from the first camera and the second image set from the second camera. The details of the first image set and the second image set are the same as those described above, and no further description is presented below.

In operation 1002, the electronic device (e.g., the electronic device 101 or the processor 120) may identify whether an object in the images of the first image set are present within the view angle area of the images. According to an embodiment, the electronic device 101 may determine the number of the images of the first image set for the external object and the number of the images of the second image set for the external object based on the position of the object in at least some images of the first image set. According to an embodiment, the processor 1030 may include a frame rate control module 1040, a combining module 1050, and a correcting module 1060. The frame rate control module 1040, the combining module 1050, and the correcting module 1060 may be, e.g., logic modules, and thus, the operations of the frame rate control module 1040, the combining module 1050, and the correcting module 1060 may be performed by the processor 1030 (e.g., the processor 120). According to an embodiment, at least one of the frame rate control module 1040, the combining module 1050, or the correcting module 1060 may be implemented in hardware inside the processor 1030. The frame rate control module 1040 may adjust the frame rate of the first camera 1010 or the second camera 1020 depending on the position of the object in the image which serves as a reference for performing IS.

In operation 1003, the electronic device (e.g., the electronic device 101 or the processor 120) may reduce the frame rate of the second camera upon determining that the object in the image of the first image set is present within the view angle area of the images of the first image set. Although FIG. 10A illustrates that the frame rate is adjusted based on the position of the object in the first image set, the position of the object in the second image set may be considered together in adjusting the frame rate. For example, where the object is within the view angle area of the image of the first image set, although the position of the object is changed, it would be less likely that the object escapes out of the image of the first image set and is distorted. Thus, the need for the second camera 1020 which captures the images of the second image set may relatively be reduced. The frame rate control module 1040 may allow for efficient use of the power source or other resources of the electronic device by reducing the frame rate of the second camera while maintaining the frame rate of the first camera. Here, the frame rate may be replaced with the clock frequency, the memory space allocated to the camera, the power allocated to the camera, network data quantity, or compression rate, and this may correspond to various resources used to obtain image information. Even when information about the motion of the object or the background in the image area of the first image set captured by the first camera in the image area of the second image set is unnecessary, the frame rate control module 1040 may reduce the frame rate of the second camera, enabling efficient use of the power source or other resources.

In operation 1004, upon determining that the object in the image of the first image set is not present within the view angle area of the images of the first image set, the electronic device (e.g., the electronic device 101 or the processor 120) may increase the frame rate of the second camera. For example, where the object is positioned over the view angle area of the image of the first image set and the view angle area of the second image set, if the object moves, it would be highly likely to escape off the first image set, thus subject to a severe distortion. Thus, the frame rate control module 1040 may increase the frame rate of the second camera 1020, setting it to be equal or higher than the frame rate of the first camera 1010.

Figure 11A:
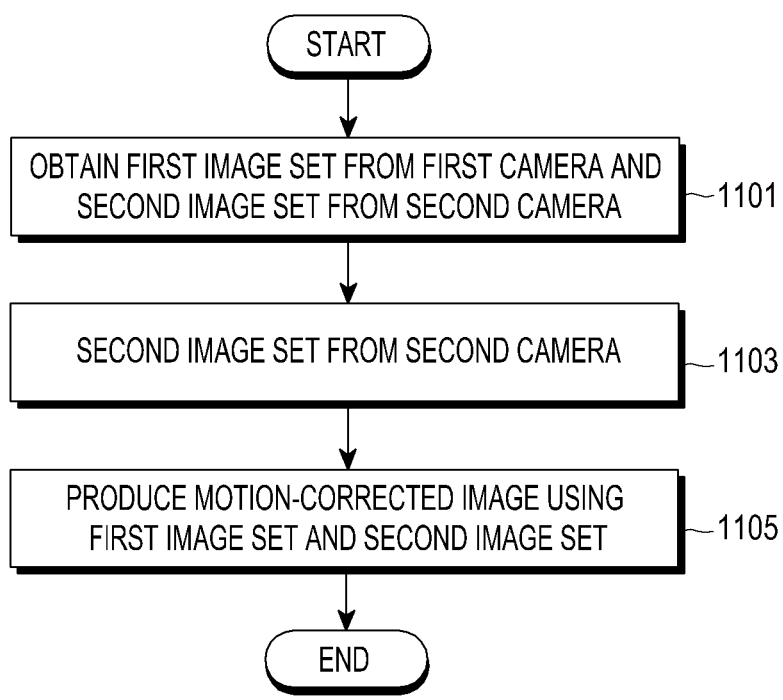
FIGS. 11A and 11B are views illustrating a configuration in which an electronic device produces a motion-corrected image using a depth sensor according to an embodiment of the disclosure.
Figure 11B:
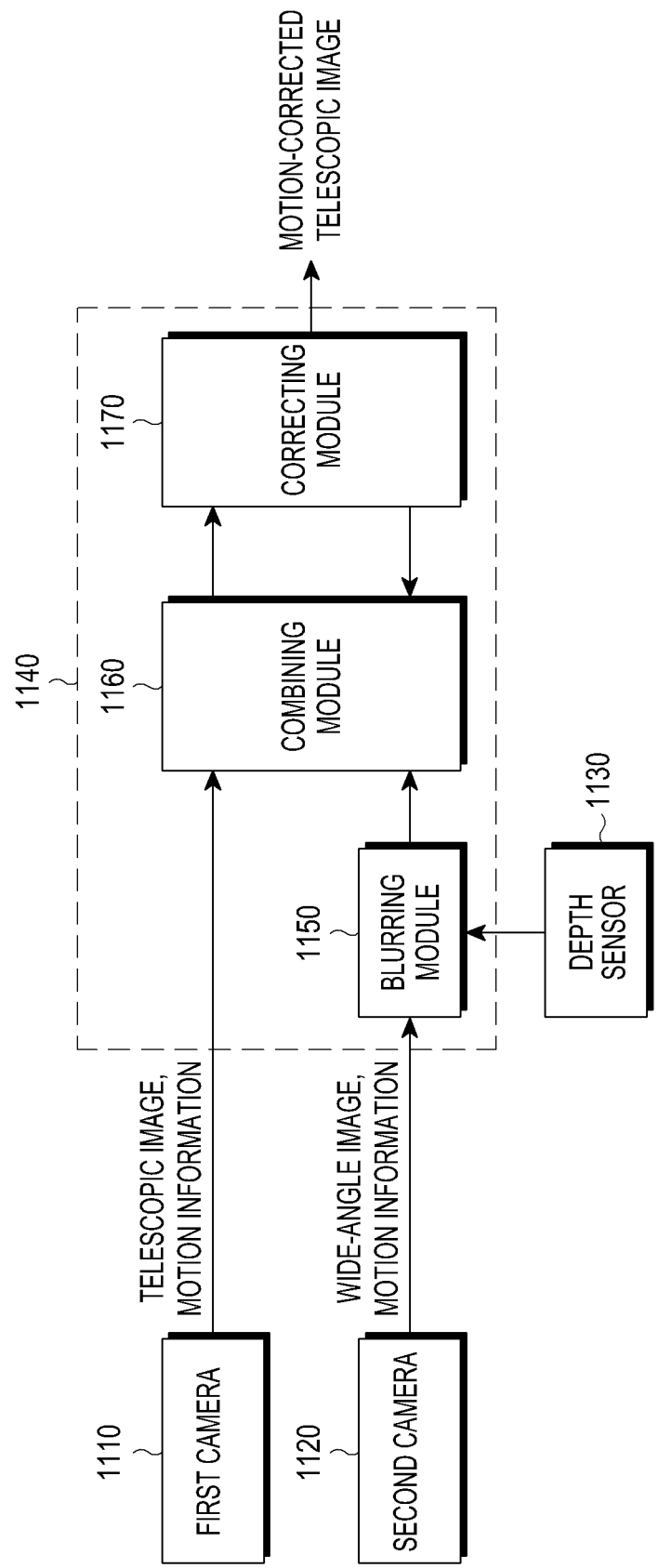

FIGS. 11A and 11B are views illustrating a configuration in which an electronic device (e.g., the electronic device 101 or the processor 120) produces a motion-corrected image using a depth sensor according to an embodiment of the disclosure.

According to an embodiment, the electronic device (e.g., the electronic device 101) may include a first camera 1110, a second camera 1120, a depth sensor 1130, and a processor 1140. The processor 1140 may include a blurring module 1150, a combining module 1160, and a correcting module 1170. The blurring module 1150, the combining module 1160, and the correcting module 1170 may be, e.g., logic modules. Thus, the operations performed by the blurring module 1150, the combining module 1160, and the correcting module 1170 may be performed by the processor 1140 (e.g., the processor 120). According to an embodiment, at least one of the blurring module 1150, the combining module 1160 or the correcting module 1170 may be implemented in hardware inside the processor 1140.

In operation 1101, the electronic device (e.g., the electronic device 101 or the processor 120) may obtain a first image set from the first camera 1110 and a second image set from the second camera 1120. The image of the first image set and the image of the second image set may differ in depth information or focal length, thus causing a difference in blurry degree. Where the correcting module 1170 synthesizes the correction area of the image of the first image set with the compensation area of the second image set, as they are, a severe defect may occur in the border between the correction area and the compensation area.

In operation 1103, the electronic device (e.g., the electronic device 101 or the processor 120) may blur at least a portion of the image of the second image set. For example, the correction area of the image of the first image set and the compensation area of the image of the second image set may be required to at least partially be blurred to be synthesized together in a natural way. The blurring module 1150 may blur the image of the second image set by focusing out each area of the image of the second image set based on depth information received from the depth sensor 1130 and the second image set received from the second camera 1120. Although not shown in the drawings, the blurring module 1150 may receive depth information from a module for generating a depth map from the image of the obtained image set and may focus out each area of the image of the second image set based on the received depth information.

In operation 1105, the electronic device (e.g., the electronic device 101 or the processor 120) may produce a motion-corrected image using the first image set and the second image set. The combining module 1160 may produce the overall motion information by combining the motion information received from the first camera 1110 and the motion information about the second camera received via the blurring module 1150 and may transmit the produced motion information to the correcting module 1170. The combining module 1160 may produce a motion-corrected image using the motion information received from the combining module 1160, the image of the first image set received from the first camera 1110, and the image captured by the second camera and blurred by the blurring module 1150.

Figure 12A:
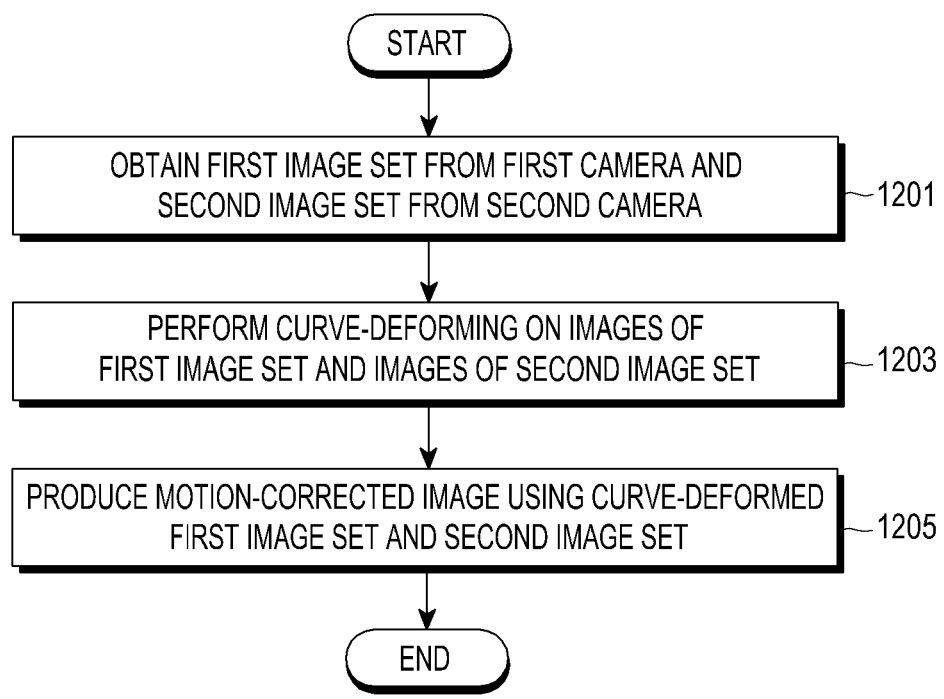
FIGS. 12A and 12B are views illustrating a configuration in which an electronic device produces a motion-corrected image by performing curve-deforming on an image according to an embodiment of the disclosure.
Figure 12B:
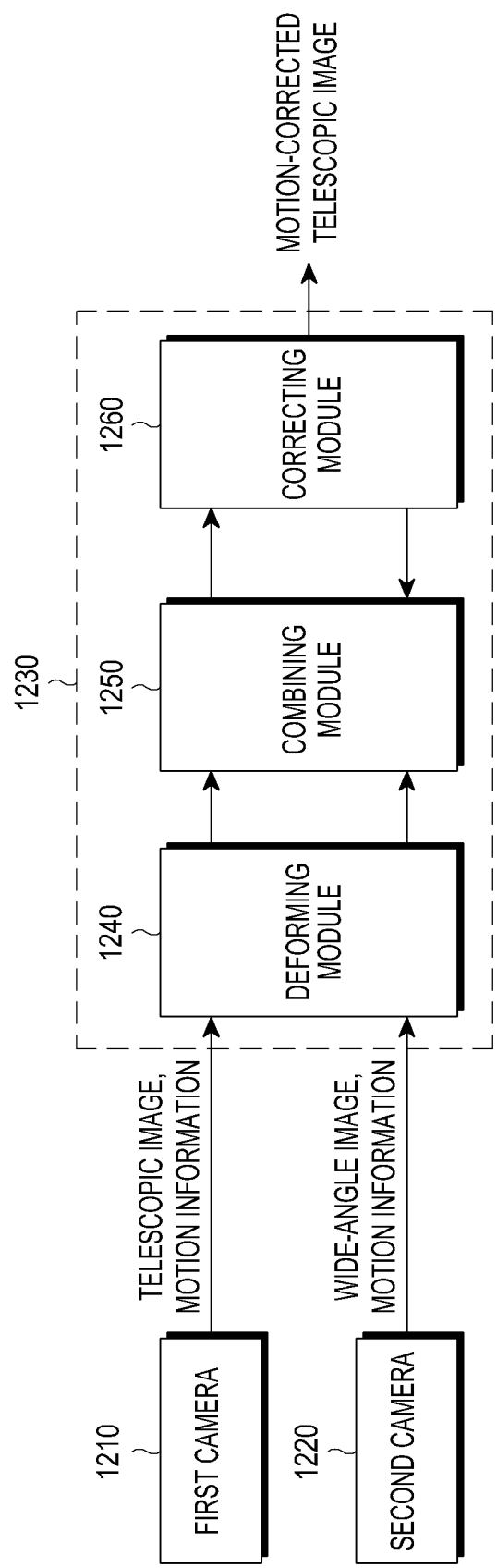

FIGS. 12A and 12B are views illustrating an example of a configuration in which an electronic device (e.g., the electronic device 101 or the processor 120) produces a motion-corrected image by performing curve-deforming on an image according to an embodiment of the disclosure.

According to an embodiment, the electronic device (e.g., the electronic device 101) may include a first camera 1210, a second camera 1220, and a processor 1230. The processor 1230 may include a deforming module 1240, a combining module 1250, and a correcting module 1260. The deforming module 1240, the combining module 1250, and the correcting module 1260 may be, e.g., logic modules. Thus, the operations performed by the deforming module 1240, the combining module 1250, and the correcting module 1260 may be performed by the processor 1230 (e.g., the processor 120). According to an embodiment, at least one of the deforming module 1240, the combining module 1250 or the correcting module 1260 may be implemented in hardware inside the processor 1230.

In operation 1201, the electronic device (e.g., the electronic device 101 or the processor 120) may obtain the first image set from the first camera and the second image set from the second camera. Since the image of the first image set is captured using a narrower-view angle camera, as compared with the image of the second image set, the image of the first image set and the image of the second image set may show different curves.

In operation 1203, the electronic device (e.g., the electronic device 101 or the processor 120) may perform a curving process on the images of the first image set and the images of the second image set. According to an embodiment, the deforming module 1240 may deform the curves of the images of the image sets obtained from the first camera 1210 and the second camera 1220. For example, the deforming module 1240 may deform the curves based on the image of the first image set or the image of the second image set, deform the curves of the image of the first image set and the image of the second image set to a particular reference value, and transmit the deformed first image set and second image set to the combining module 1250.

In operation 1205, the electronic device (e.g., the electronic device 101 or the processor 120) may produce a motion-corrected image using the curve-deformed first image set and second image set. The combining module 1250 may produce the overall motion information based on the motion information obtained from at least one of the first camera 1210 or the second camera 1220 and transmit the produced motion information to the correcting module 1260. The correcting module 1260 may produce a motion-corrected image using the motion information received from the combining module 1250 and the first image set and second image set. Configurations for producing a motion-corrected image are the same as those described above, and no detailed description thereof is given.

According to an embodiment, an electronic device (e.g., the electronic device 101) may comprise a first camera 310, a second camera 320 having a different view angle from the first camera 310, and a processor 120 configured to obtain a first image set for an external object using the first camera 310 and a second image set for the external object using the second camera 320, identify motion corresponding to the first camera 310 for a part of a time during which the first image set and the second image set are obtained, obtain a correction area using at least some images of the first image set based on at least the motion corresponding to the first camera 310, identify a compensation area in at least some images of the second image set based on at least the correction area or the motion corresponding to the first camera 310, and obtain a motion-corrected image for the external object using the correction area and the compensation area. According to an embodiment, at least a portion of the compensation area may not be included in an image obtained from the first camera 310. According to an embodiment, the processor 120 may be configured to detect motion corresponding to the second camera and identify the compensation area further using the motion corresponding to the second camera 320. According to an embodiment, the processor 120 may be configured to identify the motion corresponding to the first camera 310 using motion information obtained from a sensor operatively connected with the electronic device or vector information that is based on comparison between the at least some images of the first image set. According to an embodiment, the processor 120 may be configured to identify the compensation area in the at least some images of the second image set using motion information about a direction opposite to a motion direction obtained from the sensor operatively connected with the electronic device or information about an inverse vector of a vector that is based on the comparison between the at least some images of the first image set. According to an embodiment, the processor 120 may be configured to identify a size of the correction area based on at least a degree of the motion corresponding to the first camera. According to an embodiment, the processor 120 may be configured to obtain the motion-corrected image for the external object using depth information about the correction area and the compensation area. According to an embodiment, the processor 120 may be configured to identify the number of images included in the first image set and the number of images included in the second image set based on the position of the image of the external object included in at least some images of the first image set.

According to an embodiment, a method for controlling an electronic device (e.g., the electronic device 101) may comprise obtaining a first image set for an external object using a first camera 310 and a second image set for the external object using a second camera 320, the second camera 320 having a different view angle from the first camera 310, determining motion corresponding to the first camera 310 for a part of a time during which the first image set and the second image set are obtained, obtaining a correction area using at least some images of the first image set based on at least the motion corresponding to the first camera 310, determining a compensation area in at least some images of the second image set based on at least the correction area or the motion corresponding to the first camera 310, and obtaining a motion-corrected image for the external object using the correction area and the compensation area. According to an embodiment, at least a portion of the compensation area may not be included in an image obtained from the first camera 310. According to an embodiment, the method may further comprise detecting motion corresponding to the second camera 320 and identifying the compensation area further using the motion corresponding to the second camera 320. According to an embodiment, the method may further comprise identifying the motion corresponding to the first camera 310 using motion information obtained from a sensor operatively connected with the electronic device or vector information that is based on comparison between the at least some images of the first image set. According to an embodiment, the method may further comprise identifying the compensation area in the at least some images of the second image set using motion information about a direction opposite to a motion direction obtained from the sensor operatively connected with the electronic device or information about an inverse vector of a vector that is based on the comparison between the at least some images of the first image set. According to an embodiment, the method may further comprise identifying a size of the correction area based on at least a degree of the motion corresponding to the first camera. According to an embodiment, the method may further comprise obtaining the motion-corrected image for the external object using depth information about the compensation area and the correction area.

According to an embodiment, an electronic device may comprise a first camera 310 having a first view angle, a second camera 320 having a view angle different from the first view angle of the first camera 310, and a processor 120 configured to obtain a first image using the first camera 310 and a second image using the second camera 320 and obtain a corrected image including a first area corresponding to the first image and a second area corresponding to the second image. According to an embodiment, the processor may be configured to identify the first area and the second area based on at least motion corresponding to the first camera and produce the corrected image using the determined first area and second area. According to an embodiment, the processor may be configured to determine to include at least a portion in the second area, the portion being included in the second view angle but not included in the first view angle. According to an embodiment, the processor may be configured to obtain the corrected image by combining the second area with at least an outer portion of the first area.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing commands that are stored in a non-transitory machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semi-permanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., PlayStore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner According to various embodiments, operations performed by modules, programs, or other components may be carried out sequentially, in parallel, repeatedly, or heuristically, or at least some operations may be executed in a different order or omitted, or other operations may be added.

As is apparent from the foregoing description, according to various embodiments, the electronic device may obtain images free of view angle loss in view of the telescopic sensor.

According to various embodiments, the electronic device is not required to magnify corrected images, preventing quality loss to images obtained by the telescopic sensor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device, comprising:
a first camera having a first view angle;
a second camera having a second view angle different from the first view angle; and
at least one processor configured to:
obtain a first image set for an external object using the first camera and a second image set for the external object using the second camera,
determine a first vector of motion corresponding to the first camera while the first image set and the second image set are obtained, determine a second vector of motion corresponding to the second camera, determine, based on the first vector, a correction area corresponding to the first vector in a first image of the first image set, determine, in a second image of the second image set, a compensation area to be combined with the correction area, the compensation area determined based on:

an inverse vector of the first vector;

the first vector of the motion corresponding to the first camera; and the second vector of the motion corresponding to the second camera, and obtain a motion-corrected image including the correction area and the compensation area by combining the correction area and the compensation area, wherein the at least one processor is further configured to determine a number of image frames per unit time corresponding to the first image set for the external object and a number of image frames per unit time corresponding to the second image set for the external object, based on a position of an object in at least some images of the first image set.

2. The electronic device of claim 1, wherein the correction area is not overlapped with the compensation area in the motion-corrected image.

3. The electronic device of claim 1, wherein the at least one processor is configured to determine the first vector of the motion corresponding to the first camera using motion information obtained from a sensor operatively connected with the electronic device or vector information that is based on comparison between at least some images of the first image set.

4. The electronic device of claim 1, wherein the at least one processor is further configured to determine the correction area as the motion-corrected image when a degree of the motion of the first camera is a threshold or less.

5. The electronic device of claim 1, wherein the at least one processor is further configured to adjust a blurry degree of at least a portion of the compensation area using depth information about the compensation area and the correction area.

6. A method for controlling an electronic device, the method comprising:

obtaining a first image set for an external object using a first camera having a first view angle and a second image set for the external object using a second camera, the second camera having a second view angle from the first view angle;

determining a first vector of motion corresponding to the first camera while the first image set and the second image set are obtained;

determining a second vector of motion corresponding to the second camera;

determining, based on the first vector, a correction area corresponding to the first vector in a first image of the first image set;

determining, in a second image of the second image set, a compensation area to be combined with the correction area, the determining of the compensation area based on:

an inverse vector of the first vector, the first vector of the motion corresponding to the first camera, and the second vector of the motion corresponding to the second camera, obtaining a motion-corrected image including the correction area and the compensation area by combining the correction area and the compensation area; and determining a number of image frames per unit time corresponding to the first image set for the external object and a number of image frames per unit time corresponding to the second image set for the external object, based on a position of an object in at least some images of the first image set.

7. The method of claim 6, wherein the correction area is not overlapped with the compensation area in the motion-corrected image.

8. The method of claim 6, further comprising determining the first vector of the motion corresponding to the first camera using motion information obtained from a sensor operatively connected with the electronic device or vector information that is based on comparison between at least some images of the first image set.

9. The method of claim 6, wherein determining, based on the first vector, the correction area further comprises determining a size of the correction area based on at least a degree of the motion corresponding to the first camera.

10. The method of claim 6, wherein obtaining the motion-corrected image comprises obtaining the motion-corrected image for the external object using depth information about the compensation area and the correction area.

* * * * *